(12) United States Patent
Nakanishi et al.

(10) Patent No.: US 9,156,388 B2
(45) Date of Patent: Oct. 13, 2015

(54) VEHICLE SEAT

(71) Applicant: TOYOTA BOSHOKU KABUSHIKI KAISHA, Aichi-ken (JP)

(72) Inventors: Masashi Nakanishi, Aichi (JP); Hiroyuki Hayashi, Aichi (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/057,433

(22) Filed: Oct. 18, 2013

(65) Prior Publication Data

US 2014/0110988 A1 Apr. 24, 2014

(30) Foreign Application Priority Data

Oct. 23, 2012 (JP) ................................. 2012-233937

(51) Int. Cl.
  *B60R 22/00* (2006.01)
  *B60N 2/68* (2006.01)
  *B60N 2/70* (2006.01)
  *B60R 22/26* (2006.01)
  *B60R 22/18* (2006.01)

(52) U.S. Cl.
  CPC *B60N 2/688* (2013.01); *B60N 2/70* (2013.01); *B60R 22/26* (2013.01); *B60R 2022/1806* (2013.01)

(58) Field of Classification Search
  CPC .. B60R 22/00; B60R 2022/021; B60R 22/26; B60R 2022/1806; B60N 2/688; B60N 2/70

USPC .......................................... 297/248, 481, 482
See application file for complete search history.

(56) References Cited

U.S. PATENT DOCUMENTS

| | | | | |
|---|---|---|---|---|
| 3,228,726 | A * | 1/1966 | Petersen | 297/481 |
| 4,810,037 | A * | 3/1989 | Takagi | 297/481 |
| 5,009,469 | A * | 4/1991 | Mouri | 297/468 |
| 5,044,695 | A * | 9/1991 | Tsuchiya | 297/481 |
| 5,139,311 | A * | 8/1992 | Imai et al. | 297/481 |
| 7,281,763 | B1 * | 10/2007 | Hayashi et al. | 297/253 |
| 2009/0273223 | A1 * | 11/2009 | Gomi et al. | 297/481 |
| 2012/0043792 | A1 * | 2/2012 | Murthy | 297/233 |

FOREIGN PATENT DOCUMENTS

JP 2012-030742 2/2012

* cited by examiner

*Primary Examiner* — Philip Gabler
(74) *Attorney, Agent, or Firm* — Greenblum & Bernstein, P.L.C.

(57) ABSTRACT

A vehicle seat includes a cushion member forming an outside shape of the seat and configured to elastically support an occupant, a frame member configuring a skeleton of the seat, a belt member configured to restrain an occupant, a buckle member configured to lock the belt member, and a storage portion configured to store the buckle member. The storage portion is provided to a cutout portion or a hole portion that is formed on a lateral end portion of the cushion member. A reinforcing member that has a flat plate shape and has strength higher than the cushion member is directly or indirectly fixed to the frame member while covering the storage portion from a lateral side of the seat.

2 Claims, 5 Drawing Sheets

VEHICLE SEAT

BACKGROUND OF THE INVENTION

1. Field of the Invention

The present invention relates to a vehicle seat that includes a belt member configured to restrain an occupant, a buckle member configured to lock the belt member, and a storage portion (a portion that is capable of storing the buckle member).

2. Description of the Related Art

JP-A-2012-30742 discloses a vehicle seat including a seat cushion (a storage portion), a seat back, a belt member, and a buckle member.

The belt member is a band-shaped belt that is configured to restrain an occupant, and can be routed from the seat back to the seat cushion. In addition, the buckle member is a member that is configured to lock an end portion of the belt member, and is attached to the storage portion of the seat cushion. The storage portion is a hole portion of the seat cushion (a rear lateral portion), and is provided to be cutout, for example, in a cushion member (a member that has an outside shape of a seat, and is capable of supporting an occupant).

In the vehicle seat, the belt member is wound around the occupant while being routed from the seat back to the seat cushion, and the end portion of the belt member is locked with the buckle member, which allows the occupant on the seat to be restrained.

SUMMARY OF THE INVENTION

Incidentally, it is desired to make an area capable of receiving the occupant larger, for example, by providing the storage portion at the lateral end portion of the seat in the above-descried seat configuration from the view point of comfort of the seat or the like.

However, in the above-described configuration, the formation of the storage portion (hole portion) at the lateral end portion makes a wall surface of the storage portion that is on a lateral side of the seat (a wall body of the cushion member) thinner, so that the configuration is apt to be deteriorated in seat performance (strength and design).

The present invention has been made in view of the above circumstances, and an object of the present invention is to provide a vehicle seat which improves comfort and provides a storage portion of a buckle member with high performance.

According to an illustrative embodiment of the present invention, there is provided a vehicle seat comprising: a cushion member forming an outside shape of the seat and configured to elastically support an occupant; a frame member configuring a skeleton of the seat; a belt member configured to restrain an occupant; a buckle member configured to lock the belt member; and a storage portion configured to store the buckle member, wherein the storage portion is provided to a cutout portion or a hole portion that is formed on a lateral end portion of the cushion member, and wherein a reinforcing member that has a flat plate shape and has strength higher than the cushion member is directly or indirectly fixed to the frame member while covering the storage portion from a lateral side of the seat.

According to the above configuration, an area capable of receiving an occupant can be made relatively larger by providing the storage portion at the lateral end portion of the cushion member (this is a configuration that contributes to comfort of the seat). Further, because the flat plate-shaped reinforcing member covers a lateral side of the storage portion and is attached to the side of the frame member (a member that possesses excellent stiffness), the storage portion can be reinforced favorably.

In the above vehicle seat, a surface of the reinforcing member that is exposed at the lateral side of the seat may be covered with a sheet member that is made of same material as a surface skin member that covers the cushion member (this is a configuration for better design).

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Hereinafter, a detailed description of illustrative embodiments of the present invention will be provided with reference to FIGS. 1 to 7. It is noted that in each of the drawings, a mark F is provided on the front side of a vehicle seat, a mark B is provided on the back side of the vehicle seat, a mark UP is provided on the upper side of the vehicle seat, and a mark DW is provided on the lower side of the vehicle seat, appropriately.

Figure 1:
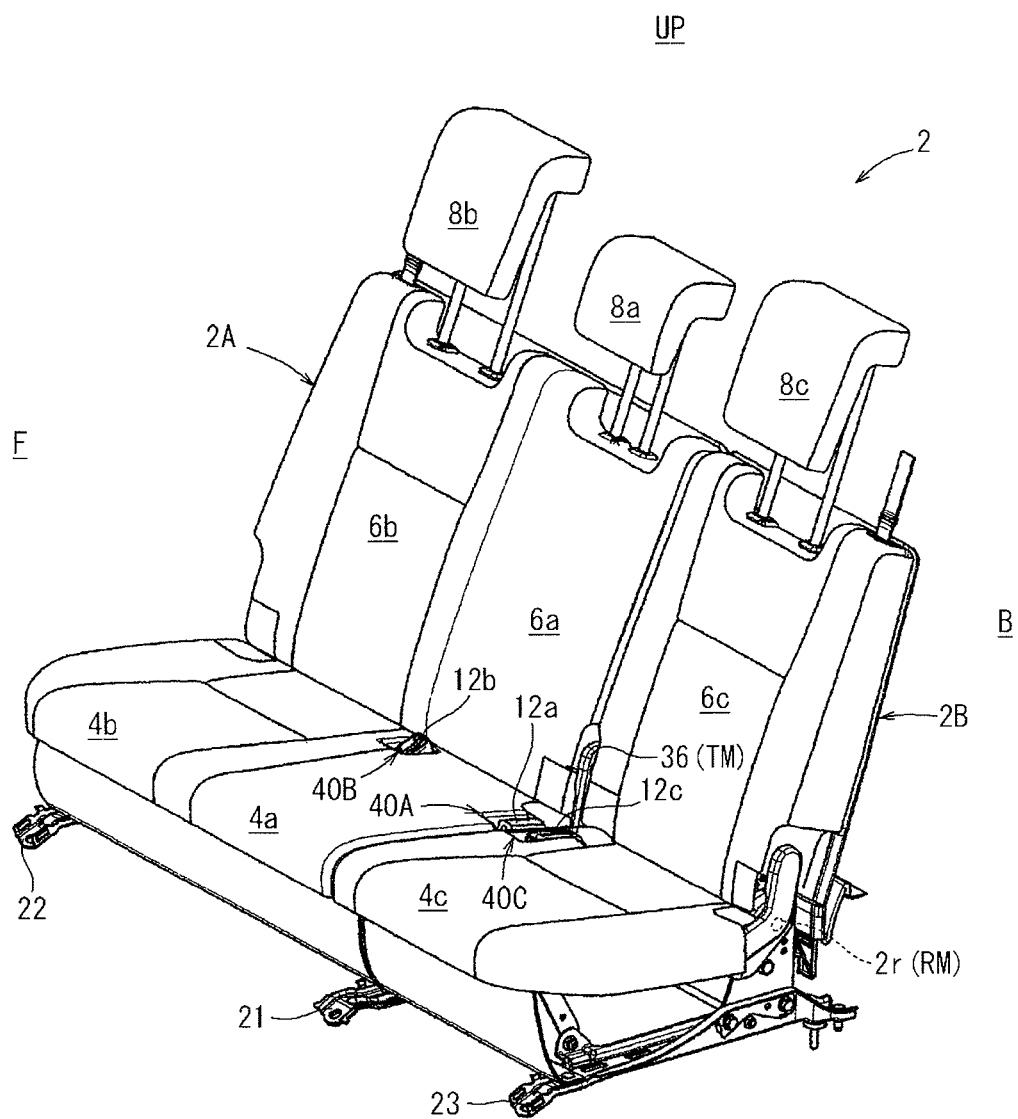
FIG. 1 is a perspective view of a vehicle seat.

Referring to FIG. 1, a vehicle seat 2 includes a first seat section 2A and a second seat section 2B, and is capable of receiving a plurality of occupants.

The first seat section 2A defines a section that is relatively large in width (a large-sized section), and includes a plurality of sets of seat constructional members (seat cushions 4a and 4b, seat backs 6a and 6b, and head rests 8a and 8b). The second seat section 2B defines a section that is relatively small in width (a small-sized section), and includes a single set of seat constructional members (a seat cushion 4c, a seat back 6c, and a head rest 8c).

Figure 3:
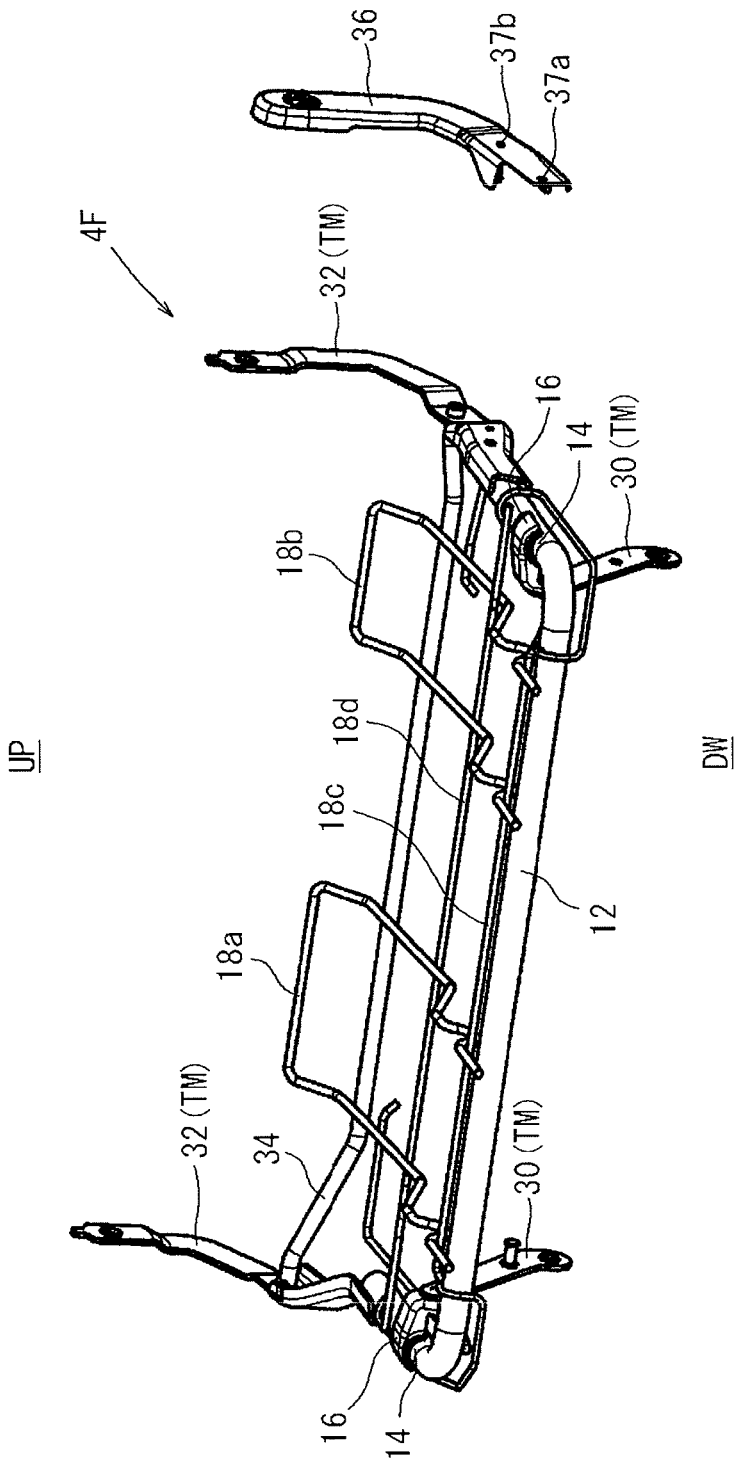
FIG. 3 is a perspective view of a frame member.
Figure 4:
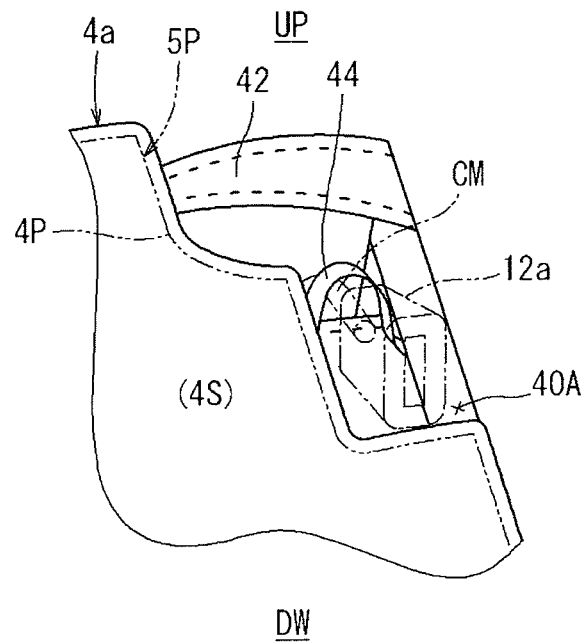
FIG. 4 is a partial perspective view of a seat cushion.
Figure 5:
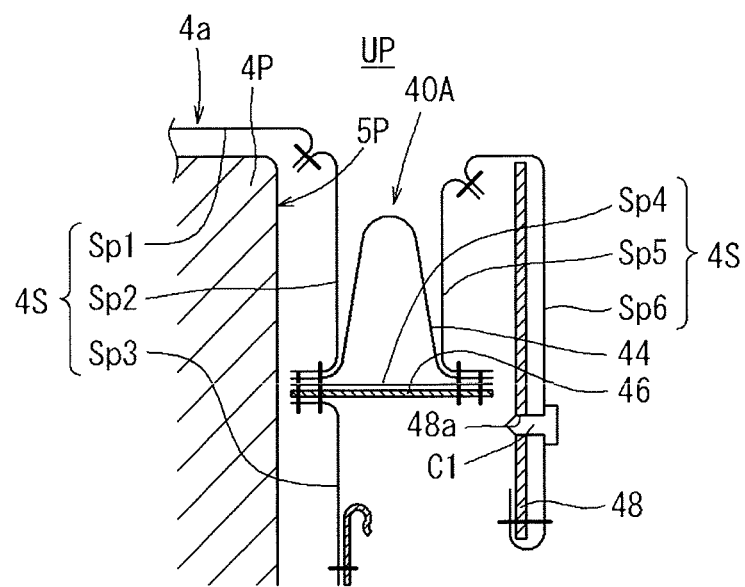
FIG. 5 is a partial cross-sectional view of the seat cushion.

Those seat constructional members include a frame member (4F or the like) that functions as a skeleton of the seat, a cushion member (4P or the like) that forms an outside shape of the seat, and a surface skin member (4S or the like) that covers the cushion member (see FIGS. 3 to 5).

Figure 2:
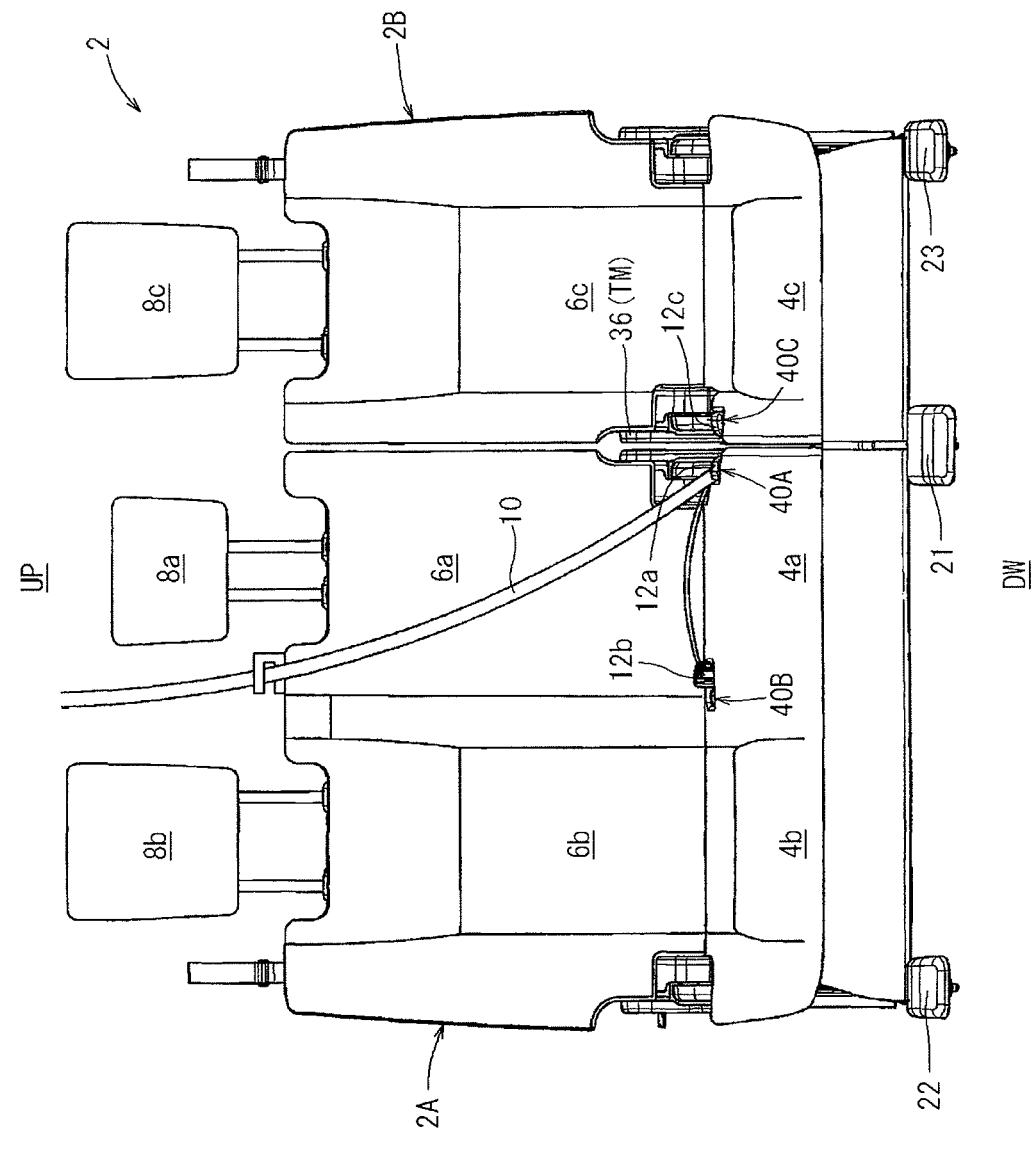
FIG. 2 is a front view of the vehicle seat.

A first leg member 21, a second leg member 22, and a third leg member 23 are arranged in parallel in an appropriate order in a direction of seats on a floor surface of a vehicle interior (see FIGS. 1 to 2).

Each of the leg members 21 to 23 is a flat plate member that is long in a front-back direction of the seat, and the leg members 21 to 23 are appropriately connected to one another with a plurality of wire members (not show). The first leg member 21 and the second leg member 22 are disposed so as to support the first seat section 2A (both sides of the first seat section 2A), and the first leg member 21 and the third leg member 23 are disposed so as to support the second seat section 2B (both sides of the second seat section 2B).

In the present illustrative embodiment, a belt member 10 that is capable of restraining an occupant, and buckle members (12a to 12c) are provided appropriately to the seat sections 2A and 2B (see FIGS. 1 and 2).

For example, the buckle members (12a and 12b) are attached to both sides of the back portion of the seat cushion 4a. The belt member 10 is a band-shaped belt that is capable of restraining an occupant, and can be drawn from a structure that is disposed above the seat (e.g., a wall body, a ceiling, and a door unit of a vehicle interior).

Then, while being drawn, the belt member 10 is made to pass through a guide (not provided with a reference numeral) that is provided at a shoulder portion of the seat back 6a, and then routed to the side of the seat cushion 4a to be wound around the occupant (not shown). In this state, the belt member 10 is locked at a middle portion with the buckle member 12a to further straddle the legs of the occupant, and an end portion of the belt member 10 is locked with the other buckle member 12b (i.e., three-point fixing).

In the present illustrative embodiment, the buckle members (12a to 12c) are attached appropriately to storage portions (40A to 40C, to be described later) provided at the back portions of the seat cushions 4a to 4C.

By providing the storage portions 40A to 40C at lateral end portions of the seat cushions 4a to 4c, areas capable of receiving occupants can be made relatively larger (this is a configuration that contributes to comfort of the seat). In this configuration, it is desired to provide the storage portions 40A to 40C with high performance (e.g., with higher strength).

Thus, the present illustrative embodiment is aiming at improving comfort of the seat, and providing the storage portion of the buckle member with high performance. Hereinafter, detailed descriptions of constructional members will be provided taking the first seat section 2A as an example. It is noted that the constructional members of the second seat section 2B relating to the present illustrative embodiment are almost same as the constructional members of the first seat section 2A, so that descriptions of the constructional members of the second seat section 2B corresponding to the constructional members of the first seat section 2A are omitted by providing corresponding reference numerals to the constructional members of the second seat section 2B.

[First Seat Section (Basic Configuration)]

The first seat section 2A includes the seat cushions 4a and 4b, the seat backs 6a and 6b, and various kinds of mechanisms (a reclining mechanism RM, and a tilt down mechanism TM) to be described later (see FIGS. 1 to 3).

The frame member 4F of the seat cushions (4a and 4b) is made of a material that is typically excellent in strength (e.g., metal and a resin). The frame member 4F according to the present illustrative embodiment is a member having an approximately rectangular frame shape, and includes a front frame 12, a pair of lateral frames 14, attaching sections 16, and a plurality of supporting wires (18a to 18d or the like) (see FIG. 3).

The front frame 12 is a member (pipe-shaped member) that constitutes front portions of the seat cushions. The pair of lateral frames 14 is members (pipe-shaped members) that constitute lateral portions of the seat cushions, and are disposed so as to face each other at the lateral sides of the seat.

The attaching sections 16 are flat plate members (each having the shape of the approximate letter L when seen in cross section) that are each attached to the lateral frames 14 (the front portions), and to which the tilt down mechanism TM (a front link 30; described later) is capable of being attached. The plurality of supporting wires (18a to 18d or the like) are members that have a linear shape and are capable of supporting the cushion members 4P, and are arranged appropriately in a plane on the frame member 4F.

The cushion members 4P of the seat cushions (4a and 4b) can be made, for example, from a polyurethane foam (density: 10 kg/m$^3$ to 60 kg/m$^3$).

The surface skin member 4S of the seat cushions (4a and 4b) is a sheet member made of cloth (woven fabric, knitted fabric, non-woven cloth) or leather (natural leather, artificial leather). The surface skin member 4S in the present illustrative embodiment is made of a plurality of surface pieces (a first piece Sp1 to a sixth piece Sp6) that are sewn to be like a bag (see FIGS. 4 and 5).

The first piece Sp1 is a surface piece that covers the upper surfaces (seat surfaces) of the cushion members 4P. The second piece Sp2 and the third piece Sp3 are surface pieces that cover the lateral surfaces (cutout portions 5p; described later) of the cushion members 4P. The fourth piece Sp4 to the sixth piece Sp6 are surface pieces that are appropriately connected to the first piece Sp1 to the third piece Sp3 described above, and can form the storage portions 40A to 40C (described later).

(Various Mechanisms)

The reclining mechanism RM is a mechanism configured to maintain a position of the seat backs 6a and 6b with respect to the seat cushions 4a and 4b, and includes an axis unit 2r that extends in a width direction of the seat (see FIG. 1).

In the present illustrative embodiment, the position of the seat backs 6a and 6b can be switched among an upright position where the seat backs 6a and 6b are uprighted with respect to the seat cushions 4a and 4b, a backward inclined position where the seat backs 6a and 6b are inclined toward the back of the seat, and a forward inclined position where the seat backs 6a and 6b are inclined toward the front of the seat by rotation movement of the seat backs 6a and 6b about the axis unit 2r.

The tilt down mechanism TM is a mechanism configured to relatively move the constructional members of the seat with respect to (closer to or farther from) the floor surface of the vehicle interior (see FIG. 3). The tilt down mechanism TM according to the present illustrative embodiment is configured by the pair of front links 30 and a pair of rear links 32 (a four-joint link configuration), and made typically from a material same as the frame member 4F.

The pair of front links 30 are flat plate members having a linear shape, respectively, and are disposed on both sides of the first seat section 2A. In the present illustrative embodiment, one side of one of the front links 30 is attached rotatable to the lateral frame 14 (the attaching section 16), and the other side is attached rotatable to the first leg member 21. The other front link 30 is attached to the lateral frame 14 and the second leg member 22 in the same manner.

The pair of rear links 32 (boomerang links) are facing links of the front links 30, and include a reinforcing pipe 34 and cover members 36 (made from a resin or metal).

Figure 7:
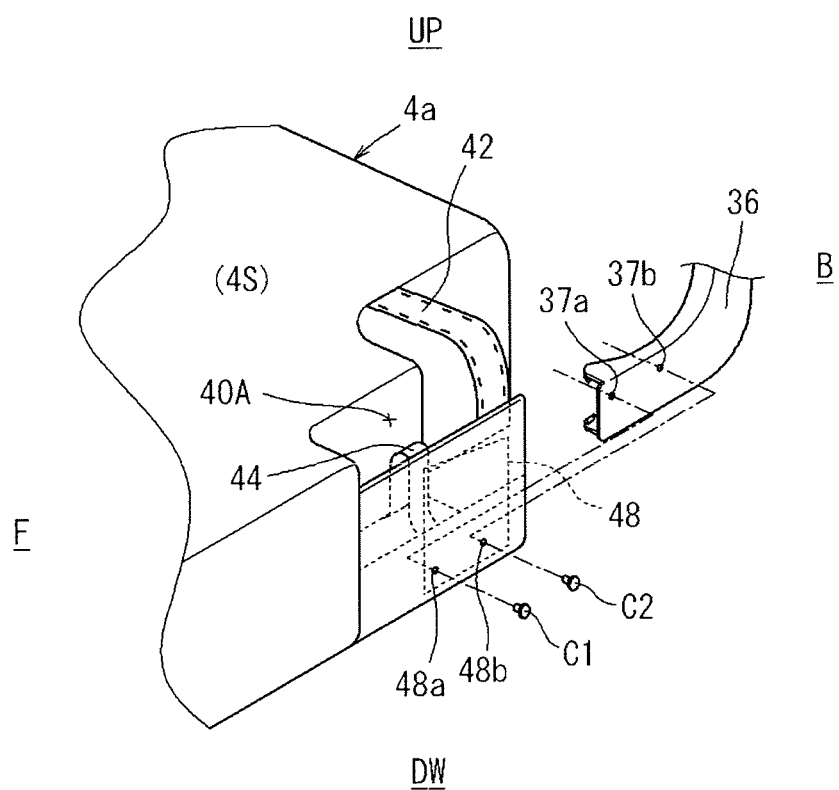
FIG. 7 is a partial exploded perspective view of the seat cushion.

The cover members 36 are flat plate members having the shape similar to a lateral-side shape of the rear links 32 (the shape of the approximate letter L when seen in a side view), and each cover member 36 includes a pair of first hole portions 37a and 37b (see FIGS. 3 and 7). The pairs of first hole portions 37a and 37b are holes that penetrate the cover members 36 in the thickness direction, and are formed on lower sides of the cover members 36 at appropriate intervals.

In the present illustrative embodiment, the rear links 32 are each attached to the back portions of the lateral frames 14 so as to extend toward the back of the seat. Then, back portions of the rear links 32 are attached tiltably (rotatably) to brackets (not shown) that are fixed to the floor surface of the vehicle interior, and the reinforcing pipe 34 is attached so as to bridge between the pair of the rear links 32.

The lateral faces of the rear links 32 are covered with the cover members 36, and while lower sides of the cover members 36 are projected to the front side of the seat, the rear links 32 are disposed on lateral faces of the back portions (the storage portions 40A or the like to be described later) of the seat cushions 4a or the like (see FIG. 7).

Then, by forward inclining movement of the seat backs 6a and 6b, and by bringing the front links 30 and the rear links 32 into the forward inclined state, the constructional members of the seat are disposed close to the floor surface of the vehicle interior (brought into a tilt down state). In contrast, by upright movement of the seat backs 6a and 6b, and by bringing the front links 30 and the rear links 32 into the upright state, the constructional members of the seat are disposed apart from the floor surface of the vehicle interior (brought into a state where occupants can be seated).

[Storage Portion]

The plurality of storage portions 40A to 40C are space portions where the buckle members (12a to 12c) that respectively correspond to the storage portions 40A to 40C can be disposed, and are formed at the lateral end portions of the seat cushions (4a and 4c) that correspond to the storage portions 40A to 40C (see FIG. 1). Hereinafter, because the configurations of the storage portions 40A to 40C are almost same, a description of the storage portion 40A on one lateral side of the seat cushion 4a will be provided as an example.

The storage portion 40A according to the present illustrative embodiment can be formed at the lateral end portion (the cutout portion 5p) of the cushion member 4P. Then, the storage portion 40A can be formed by a part of the surface skin member (Sp2, and Sp4 to Sp6), constructional members relating to the part of the surface skin member (a first band member 42, a second band member 44, and a reinforcing plate member 46), and a reinforcing member 48 (described later) (FIGS. 4 to 7).

The cutout portion 5p is a portion of the seat cushion 4a that is made by cutting the seat cushion 4a so as to have a stepwise portion (when see in a top plan view), and can be formed at a lateral edge on the back end of the seat cushion 4a. In the present illustrative embodiment, the rear link 32 (the cover member 36) extends toward the front portion of the cutout portion 5p, and the pair of first hole portions 37a and 37b are disposed so as to be capable of facing an inner face side of the reinforcing member 48.

The storage portion 40A is a space portion having a pocket shape (a shape such that the upper portion is open) and formed of the plurality of surface pieces (Sp2, and Sp4 to Sp6), and is formed on the front side of the cutout portion 5p.

The first band member 42 and the second band member 44 are members having a belt shape, and are made of cloth or leather. The reinforcing plate member 46 is a plate member (typically made from a resin) having the shape similar to the shape of the fourth piece Sp4.

In the present illustrative embodiment, while being disposed under the fourth piece Sp4, the reinforcing plate member 46 is sandwiched between and sewed together with the second piece Sp2 and the third piece Sp3, and projected in the seat width direction. While sewed on an end portion of the fourth piece Sp4, the fifth piece Sp5 is projected upward. The fifth piece Sp5 and the sixth piece Sp6 are sewed together so as to have the shape of the approximate inverted letter U, and thereby the storage portion 40A having the pocket shape (the space portion) can be formed.

Further, in the present illustrative embodiment, the first band member 42 is sewed onto and bridged between the first piece Sp1 (upper potion) and the sixth piece Sp6 (upper potion), and thereby the storage portion 40A can be reinforced. The second band member 44 is bent so as to have an approximate arch shape to be disposed on a bottom surface of the storage portion 40A, and then both ends of the second band member 44 are sewed together with the second piece Sp2 (the lower portion) and the fifth piece Sp5 (the lower portion).

(Reinforcing Member)

Figure 6:
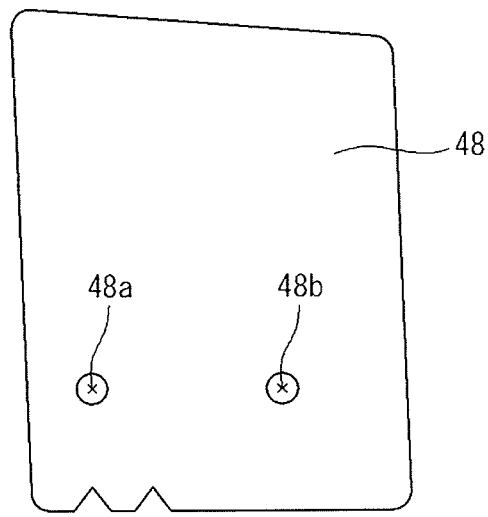
FIG. 6 is a front view of a reinforcing member.

The reinforcing member 48 is a flat plate member capable of covering a lateral side (the entire or a part thereof) of the storage portion 40A, and is made from a material that has a strength higher than the cushion member 4P (the material is typically a resin or metal) (see FIGS. 5 to 7).

The reinforcing member 48 according to the present illustrative embodiment is a flat plate member having an approximately rectangular shape, and includes a pair of second hole portions 48a and 48b. The pair of second hole portions 48a and 48b are hole portions that penetrate the reinforcing member 48 in the thickness direction, are formed in a lower portion of the reinforcing member 48 at appropriate intervals, and are disposed so as to be capable of facing the pair of corresponding first hole portions 37a and 37b.

(Installation Operation of the Reinforcing Member)

The reinforcing member 48 is disposed on a back surface side of the six piece Sp6 referring to FIGS. 5 to 7. Thus, one surface of the reinforcing member 48 that is exposed on the lateral side of the seat is covered with the sixth piece Sp6 (the sheet member that is made of same material as the surface skin member that covers the cushion member 4P). A lower portion of the sixth piece Sp6 is sewed on the other surface of the reinforcing member 48 while being folded inward in this state, and thereby the lateral side of the storage portion 40A can be covered by the reinforcing member 48.

Then, while being inserted between the fifth piece Sp5 and the sixth piece Sp6, the cover member 36 (the lower portion) is disposed on a back surface side of the reinforcing member 48 so as to face the reinforcing member 48. Then, while positional adjustment between the first hole portions 37a and 37b and the second hole portions 48a and 48b is made, clip members C1 and C2 are inserted into the first hole portions 37a and 37b and the second hole portions 48a and 48b. Thus, the reinforcing member 48 can be attached to the frame member 4F via the cover member 36 (the rear link 32).

[Installation Operation of the Buckle Member]

Referring to FIGS. 1, 4 and 7, the buckle member 12a (having a shape of an approximate rectangular prism) is disposed inside the storage portion 40A.

At this time, while the buckle member 12a is disposed toward the front side of the seat so as to be inclined upward, a joining section CM (a flat plate member having the shape of the letter L) that extends from the buckle member 12a is made to pass through the second band member 44. Then, the joining section CM is attached to the side of the frame member 4F, and thereby the buckle member 12a can be disposed inside the storage portion 40A in a stable manner (see FIG. 3).

In the present illustrative embodiment, referring to FIG. 1, the area capable of receiving an occupant can be made relatively larger by providing the storage portion 40A at the lateral end portion of the cushion member 4P (this is a configuration that contributes to comfort of the seat). Further, the storage portion 40A can be favorably reinforced by attaching the reinforcing member 48 having the flat plate shape to the side of the frame member 4F (a member that possesses excellent stiffness) while covering the lateral side of the storage portion 40A with the reinforcing member 48.

Further, in the present illustrative embodiment, referring to FIGS. 5 and 7, the surface of the reinforcing member 48 that is exposed on the lateral side of the seat is covered with the sixth piece Sp6 (this is a good-looking seat configuration). Thus, covering the lateral side of the storage portion 40A with the reinforcing member 48 (the sixth piece Sp6) can prevent the buckle member 12a from being exposed to view as much as possible.

Thus, according to the present illustrative embodiment, it is possible to improve comfort of the seat, and to provide the storage portion 40A or the like of the buckle member 12a with high performance.

The vehicle seat according to the present illustrative embodiment is not limited to the configuration of the above-described illustrative embodiment, and can have a variety of other configurations.

(1) In the present illustrative embodiment, described is the example that the storage portion (40A or the like) is provided to the cutout portion 5p of the cushion member 4P. Different from this configuration, it is also possible to provide the storage portion to a hole portion of the cushion member, and to cover a wall surface of the storage portion that is on the lateral side of the seat (a thin wall body of the cushion member) with a reinforcing member. This configuration can prevent waviness or breakage (rupture or the like) occurring in the wall surface (typically equal to or less than 10 mm in thickness) of the storage portion that is on the lateral side of the seat as much as possible (this is a configuration superior in design performance and in strength).

(2) In the present illustrative embodiment, described as the example is the configuration of the reinforcing member 48 (the shape, the installation number, the position to be attached to, or the like); however, the description is not intended to limit the configuration of this member. It is essential only that the shape of the reinforcing member should be a shape at least capable of covering the entire or a part of the storage portion from the lateral side of the seat. For example, it is also possible to give the reinforcing member the shape of the approximate letter L (when seen in cross section) so as to cover the bottom of the storage portion, and thereby the reinforcing plate member can be omitted.

(3) In the present illustrative embodiment, described as the example is to cover the reinforcing member 48 with a part of the surface skin member (the sixth piece Sp6). Different from this configuration, it is also possible to cover the reinforcing member 48 with a sheet member that is different from the surface skin member (a sheet member that is made of material same as or different from the surface skin member). In addition, it is possible not to cover the reinforcing member with a sheet member.

(4) In the present illustrative embodiment, described as the example is to fix the reinforcing member 48 to the frame member 4F via the cover member 36 of the rear link 32 (in an indirect manner). Different from this configuration, it is also possible to fix the reinforcing member directly to the frame member. It is noted that the reinforcing member is attached not only by the attaching method using the above-described clip members, but also by a variety of attaching methods using a bolt member or the like. It is also possible to provide an attaching member (a protrusion having a clip shape) to the main body of the reinforcing member so as to be insertable into the cover member.

(5) In the present illustrative embodiment, described as the example is the first seat section 2A; however, the configuration according to the present illustrative embodiment can be applied also to the second seat section, so that the configuration according to the present illustrative embodiment can be applied also to a single-occupant vehicle seat. In addition, the constructional members of each seat section (a belt member, a buckle member or the like) can be changed appropriately.

What is claimed is:

1. A vehicle seat comprising:
   a seat cushion and a seat back;
   a cushion member forming an outside shape of the seat cushion and configured to elastically support buttocks of an occupant;
   a frame member configuring a skeleton of the seat;
   a belt member configured to restrain an occupant;
   a buckle member configured to lock the belt member; and
   a storage portion configured to store the buckle member,
   wherein the storage portion is provided to a cutout portion or a hole portion that is formed on a lateral end portion of the cushion member,
   wherein a reinforcing member that has a flat plate shape and has strength higher than the cushion member is directly or indirectly fixed to the frame member while covering the storage portion from a lateral side of the seat, and wherein a surface of the reinforcing member that is exposed at the lateral side of the seat is covered with a sheet member that is made of the same material as a surface skin member that covers the cushion member.

2. The vehicle seat according to claim 1,
   wherein the reinforcing member is directly fixed to the frame member.

* * * * *